(12) United States Patent
Zhang et al.

(10) Patent No.: US 12,400,353 B2
(45) Date of Patent: Aug. 26, 2025

(54) VEHICULAR VISION SYSTEM WITH OBJECT DETECTION AND IDENTIFICATION WITH ADAPTIVE THRESHOLDING

(71) Applicant: Magna Electronics Inc., Auburn Hills, MI (US)

(72) Inventors: Liang Zhang, Ottawa (CA); Brijendra Kumar Bharti, Brampton (CA)

(73) Assignee: Magna Electronics Inc., Auburn Hills, MI (US)

( * ) Notice: Subject to any disclaimer, the term of this patent is extended or adjusted under 35 U.S.C. 154(b) by 335 days.

(21) Appl. No.: 18/314,311

(22) Filed: May 9, 2023

(65) Prior Publication Data

US 2023/0368411 A1 Nov. 16, 2023

Related U.S. Application Data

(60) Provisional application No. 63/364,426, filed on May 10, 2022.

(51) Int. Cl.
| | |
|---|---|
| *H04N 25/76* | (2023.01) |
| *G06T 5/20* | (2006.01) |
| *G06T 5/70* | (2024.01) |
| *G06T 7/20* | (2017.01) |

(Continued)

(52) U.S. Cl.
CPC .............. *G06T 7/70* (2017.01); *G06T 5/20* (2013.01); *G06T 5/70* (2024.01); *G06T 7/20* (2013.01); *G06V 10/761* (2022.01); *H04N 25/76* (2023.01); *G06T 2207/30252* (2013.01)

(58) Field of Classification Search
None
See application file for complete search history.

(56) References Cited

U.S. PATENT DOCUMENTS

| | | |
|---|---|---|
| 5,550,677 A | 8/1996 | Schofield et al. |
| 5,670,935 A | 9/1997 | Schofield et al. |
| 5,949,331 A | 9/1999 | Schofield et al. |

(Continued)

OTHER PUBLICATIONS

Dellaert et al., "Robust car tracking using Kalman filtering and Bayesian templates", SPIE 3207, Intelligent Transportation Systems, (Jan. 27, 1998); (Year: 1998).*

(Continued)

*Primary Examiner* — Randolph I Chu
(74) *Attorney, Agent, or Firm* — HONIGMAN LLP (57) ABSTRACT

A vehicular vision system includes a camera disposed at a vehicle. Responsive to processing at an image processor of a first frame of image data captured by the camera, the system detects a first object exterior of the vehicle, and responsive to processing at the image processor of a second frame of image data captured by the camera, the system detects a second object exterior or the vehicle. The system determines, based on a similarity measure, that the second object is the same as the first object and, responsive to determining that the second object is the same as the first object, using a smoothing filter, modifies the determined second position of the second detected object. The system, based on the modified determined second position of the second detected object relative to the equipped vehicle, updates parameters of the smoothing filter. The system tracks the second detected object.

21 Claims, 7 Drawing Sheets

(51) Int. Cl.
*G06T 7/70* (2017.01)
*G06V 10/74* (2022.01)

(56) References Cited

U.S. PATENT DOCUMENTS

| | | | |
|---|---|---|---|
| 7,038,577 B2 | 5/2006 | Pawlicki et al. | |
| 7,720,580 B2 | 5/2010 | Higgins-Luthman | |
| 7,855,755 B2 | 12/2010 | Weller et al. | |
| 8,581,983 B2 | 11/2013 | Shi et al. | |
| 8,611,591 B2 * | 12/2013 | Coffman | G06T 7/277 |
| | | | 382/104 |
| 9,205,776 B2 | 12/2015 | Turk | |
| 9,487,235 B2 | 11/2016 | Bajpai et al. | |
| 9,547,795 B2 | 1/2017 | Gupta | |
| 9,563,951 B2 | 2/2017 | Okouneva | |
| 9,619,716 B2 | 4/2017 | Pflug | |
| 9,898,671 B2 | 2/2018 | Gupta et al. | |
| 9,946,940 B2 | 4/2018 | Gupta et al. | |
| 10,071,687 B2 | 9/2018 | Ihlenburg et al. | |
| 10,078,789 B2 | 9/2018 | Gupta et al. | |
| 10,095,935 B2 | 10/2018 | Gupta | |
| 10,099,614 B2 | 10/2018 | Diessner | |
| 10,204,279 B2 | 2/2019 | Gupta et al. | |
| 10,210,399 B2 | 2/2019 | Sabeti | |
| 10,210,404 B2 | 2/2019 | Gupta et al. | |
| 10,268,904 B2 | 4/2019 | Gupta | |
| 10,449,899 B2 | 10/2019 | Gupta et al. | |
| 10,452,931 B2 | 10/2019 | Gupta | |
| 10,677,894 B2 | 6/2020 | Wodrich et al. | |
| 10,691,943 B1 | 6/2020 | Ferstl et al. | |
| 10,713,506 B2 | 7/2020 | Gupta et al. | |
| 10,755,110 B2 | 8/2020 | Bajpai | |
| 10,883,846 B2 | 1/2021 | Seifert | |
| 11,048,277 B1 * | 6/2021 | Zhu | H04N 13/239 |
| 11,175,516 B1 | 11/2021 | Canberk et al. | |
| 11,615,262 B2 * | 3/2023 | Mathew | G06V 10/762 |
| | | | 382/103 |
| 11,679,635 B2 * | 6/2023 | Zhang | B60D 1/62 |
| | | | 382/103 |
| 11,693,108 B2 * | 7/2023 | Shimizu | G01S 13/931 |
| | | | 342/146 |
| 12,167,171 B2 | 12/2024 | Zhang | |
| 2008/0013837 A1 * | 1/2008 | Porter | G06V 40/165 |
| | | | 382/218 |
| 2013/0142426 A1 | 6/2013 | Kaneda et al. | |
| 2014/0193071 A1 | 7/2014 | Cho et al. | |
| 2016/0180158 A1 | 6/2016 | Gupta et al. | |
| 2016/0210728 A1 | 7/2016 | Tojo | |
| 2018/0307911 A1 | 10/2018 | Zohourian et al. | |
| 2019/0258878 A1 | 8/2019 | Koivisto et al. | |
| 2020/0160538 A1 | 5/2020 | Daniel et al. | |
| 2021/0035273 A1 | 2/2021 | Deng et al. | |
| 2021/0170820 A1 * | 6/2021 | Zhang | B60D 1/36 |
| 2021/0216752 A1 | 7/2021 | Trani et al. | |
| 2021/0309218 A1 * | 10/2021 | Hashimoto | B60W 30/09 |
| 2022/0044064 A1 | 2/2022 | Zhang et al. | |
| 2022/0065587 A1 * | 3/2022 | Koblick | G01S 13/72 |
| 2022/0101024 A1 | 3/2022 | Zhang et al. | |
| 2022/0189264 A1 | 6/2022 | Oami | |
| 2022/0383662 A1 | 12/2022 | Javan Roshtkhari et al. | |
| 2023/0014519 A1 | 1/2023 | Choi et al. | |
| 2023/0085024 A1 | 3/2023 | Zhang et al. | |
| 2023/0086389 A1 | 3/2023 | Wu | |
| 2023/0106188 A1 * | 4/2023 | Zhang | H04N 25/76 |
| | | | 348/148 |
| 2023/0196585 A1 * | 6/2023 | Nachum | G06T 3/40 |
| | | | 382/103 |
| 2023/0326040 A1 * | 10/2023 | Uchida | G06T 7/246 |
| | | | 382/103 |
| 2023/0368411 A1 | 11/2023 | Zhang et al. | |

OTHER PUBLICATIONS

Teoh et al., "A Reliability Point and Kalman Filter-based Vehicle Tracking Technique", The University of Western Australia (Year: 2022).*

Xiaohong et al., "Real-time vehicles tracking based on Kalman filter in an ITS", Proc. of SPIE vol. 6623, 662306, (2008) (Year: 2008).*

* cited by examiner

VEHICULAR VISION SYSTEM WITH OBJECT DETECTION AND IDENTIFICATION WITH ADAPTIVE THRESHOLDING

CROSS REFERENCE TO RELATED APPLICATION

The present application claims the filing benefits of U.S. provisional application Ser. No. 63/364,426, filed May 10, 2022, which is hereby incorporated herein by reference in its entirety.

FIELD OF THE INVENTION

The present invention relates generally to a vehicle vision system for a vehicle and, more particularly, to a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A vehicular vision system includes a camera disposed at a vehicle equipped with the vehicular vision system that views exterior of the equipped vehicle and captures image data. The camera includes a CMOS imaging array that includes at least one million photosensors arranged in rows and columns. The system includes an electronic control unit (ECU) with electronic circuitry and associated software. The electronic circuitry of the ECU includes an image processor for processing image data captured by the camera to detect presence of objects in the field of view of the camera. The vehicular vision system, via processing at the image processor of a first frame of image data captured by the camera, detects a first object exterior of the equipped vehicle and determines a first position of the first detected object relative to the equipped vehicle. The vehicular vision system, via processing at the image processor of a second frame of image data captured by the camera subsequent to the first frame of image data captured by the camera, detects a second object exterior of the equipped vehicle and determines a second position of the second detected object relative to the equipped vehicle. The vehicular vision system determines, based on a similarity measure between the first detected object and the second detected object, that the second detected object is the same object as the first detected object. Responsive to determining that the second detected object is the same object as the first detected object, the vehicular vision system, using a smoothing filter, modifies the determined second position of the second detected object based in part on the determined first position of the first detected object. The vehicular vision system, based on the modified determined second position of the second detected object relative to the equipped vehicle, updates parameters of the smoothing filter. The vehicular vision system tracks the second detected object in subsequent frames of image data captured by the camera subsequent to the second frame of image data captured by the camera based at least in part on the modified determined second position of the second detected object. The vehicular vision system, responsive to tracking of the second detected object, controls a function of the equipped vehicle.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a display, such as a rearview display or a top down or bird's eye or surround view display or the like.

Figure 1:
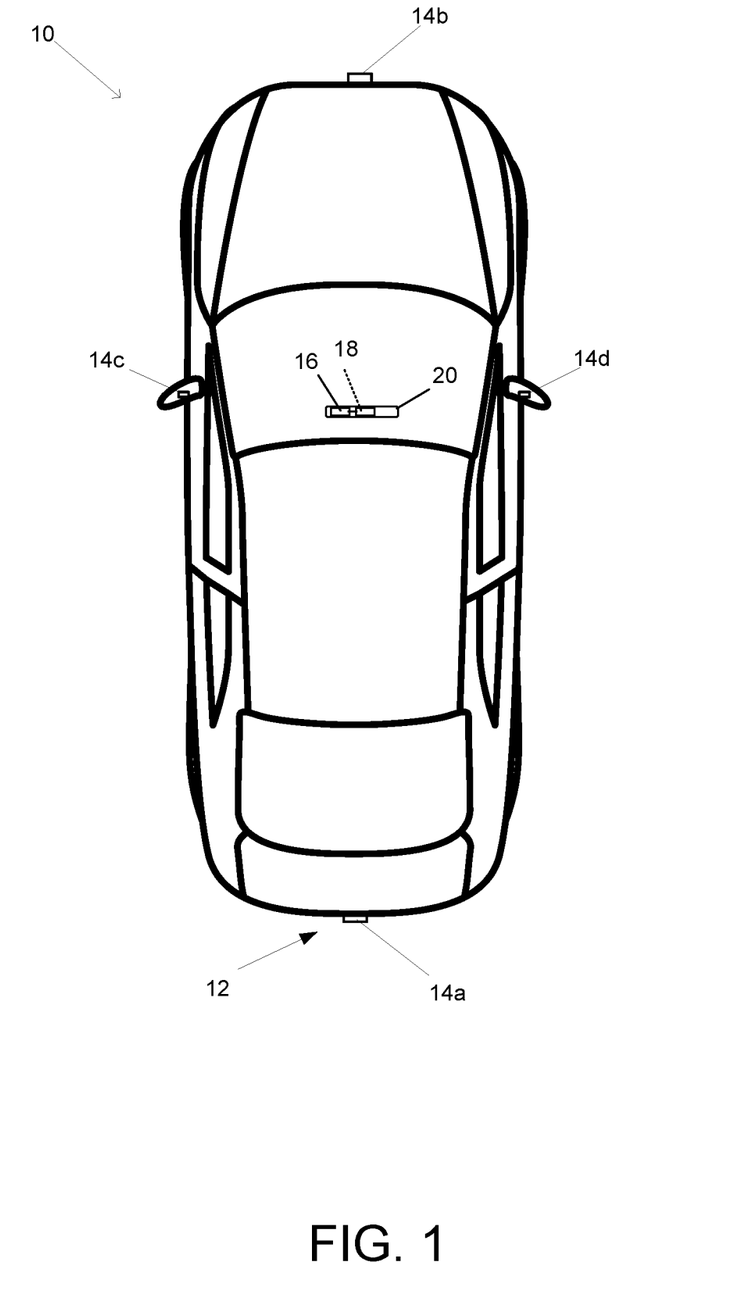
FIG. 1 is a plan view of a vehicle with a vision system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera 14*a* (and the system may optionally include multiple exterior viewing imaging sensors or cameras, such as a forward viewing camera 14*b* at the front (or at the windshield) of the vehicle, and a sideward/rearward viewing camera 14*c*, 14*d* at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Figure 2:
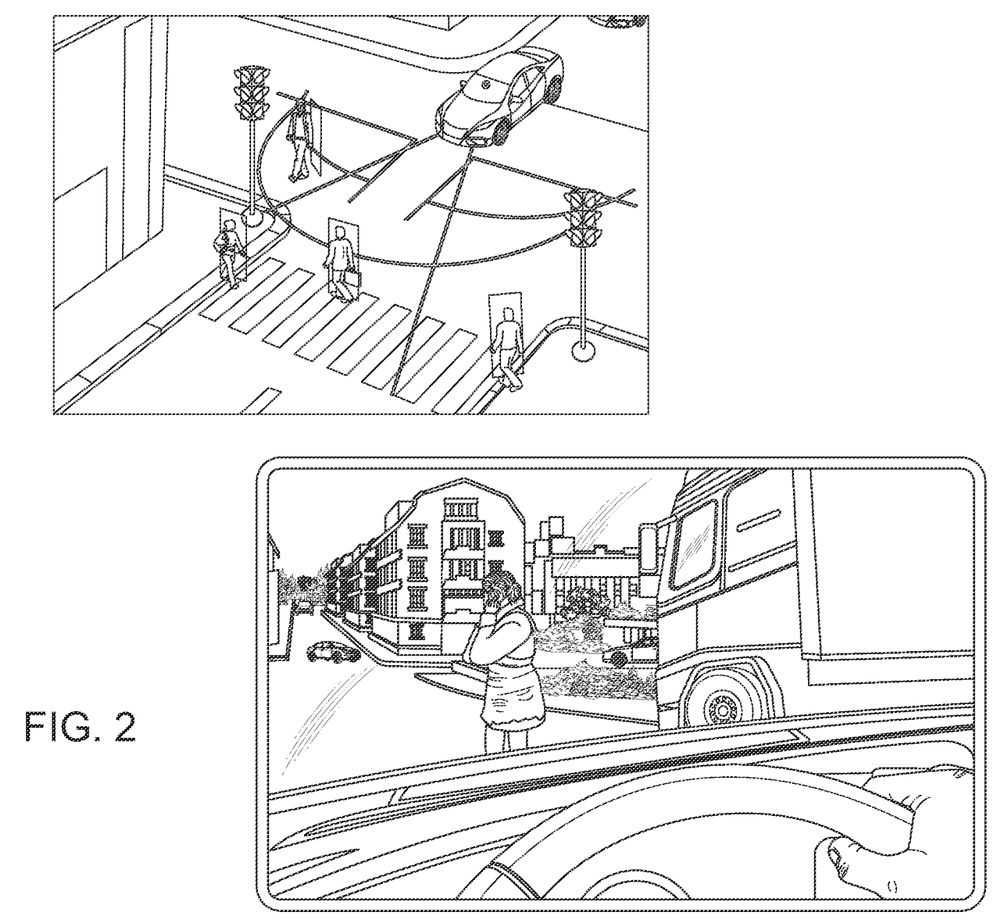
FIG. 2 shows a vehicle at an intersection and shows an image captured by a camera of the vehicle.

Surround awareness and driver assistance systems are increasingly popular features in vehicles. These systems often provide generic object identification and detection using one or more fish eye cameras. Object identification and/or detection is used to add value to existing detection based algorithms (e.g. blind spot detection, automatic emergency braking, automatic parking spot detection, lane keeping systems, pedestrian detection, etc.) and/or act as a standalone object identification and detection feature (FIG. 2). Object identification and detection is generally a tracking-and-identification/detection problem which requires the information pertaining to correspondent feature location information in consecutive images and/or camera parameters at each viewpoint of a moving camera.

Traditional techniques are centered on object identification and detection using feature and object detection, object extraction and identification, or object classification via machine learning/deep learning technology. Due to image noise and frame-to-frame variation of the shapes of objects (e.g., from object, vehicle movement, environmental conditions, etc.), traditional detection algorithms generate outputs that suffer from temporal inconsistencies (e.g., variations of the detected object location) and/or missed detection (i.e., no detection in one or more frames).

Figure 3:
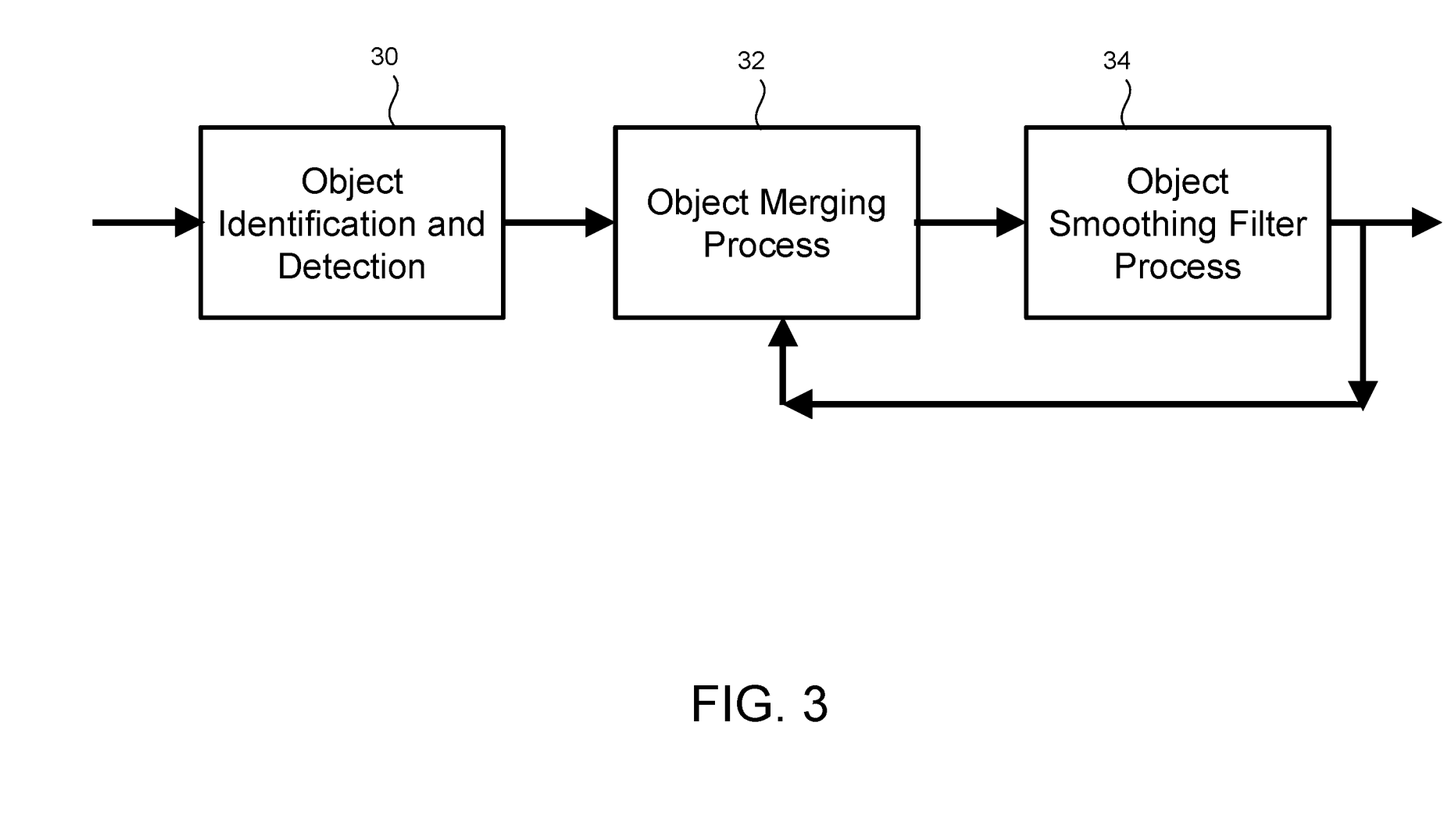
FIG. 3 is a block diagram of a vehicular vision system.

To mitigate the effects of temporally inconsistent and missing object detection, implementations herein include a tracking-and-detection based system to detect obstacle objects from images captured by cameras. The system may include multiple modules, such as an object identification and detection model 30, an object merging process module 32, and object smoothing filter process module 34 (FIG. 3).

The object identification and detection module 30 may detect/track target objects using captured sensor data (e.g., image data captured by one or more cameras) via one or more object identification algorithms such as machine learning algorithms and deep learning or feature based object detection methods. The object merging process module 32, based on object associated costs relative to object locations and distances (e.g., a distance of the detected object from the equipped vehicle), assigns or correlates newly identified objects to objects which are filtered from previous objects in order to associate current objects with previous identified/tracked objects. That is, the object merging process 32 determines whether a newly detected object is actually a previously detected object (e.g., when the object and/or the vehicle have moved, causing the position, orientation, profile, and/or shape of the object to change from the perspective of the camera). The object smoothing filter process module 34 reduces the location variation of a detected object in consecutive image frames and provides a smooth output from previously detected and tracked objects. The system then continues to track merged and smoothed objects (e.g., via an object list).

Figure 4:
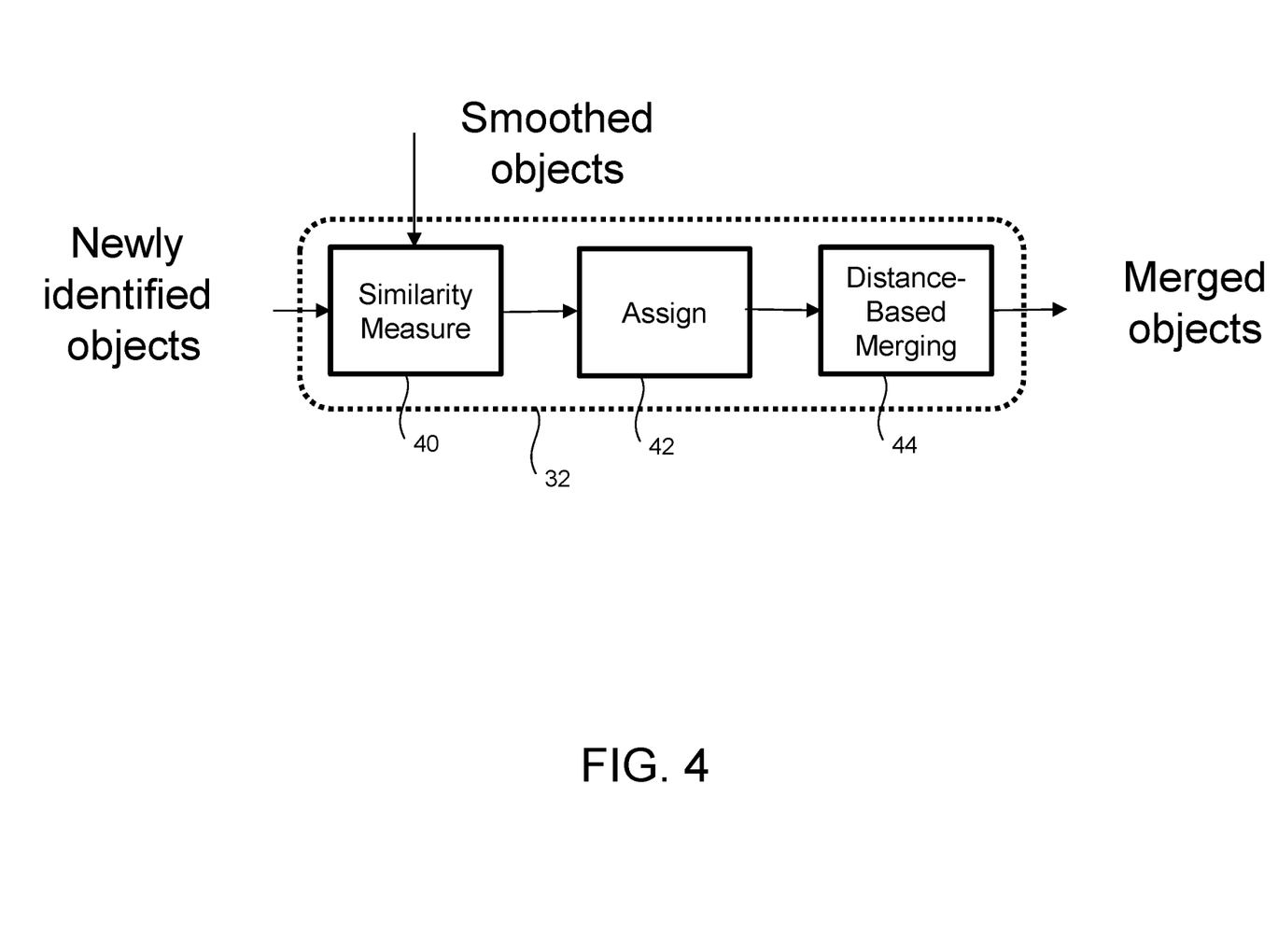
FIG. 4 is a block diagram of an object identification and detection module of the vehicular vision system of FIG. 3.

Referring now to FIG. 4, the merging process of the object merging process module 32 may include a similarity measure step 40, an assign step 42, and a distance-based merging step 44. The similarity step 40 may determine a similarity between newly identified objects and smoothed objects (i.e., from the object smoothing filter process module 34) based on one or more attributes (e.g., geometric attributes) of the detected objects (e.g., the object image location and/or distance) to build a cost map. Based on the cost map, the minimum cost pair may be determined and the object may be identified based on the minimum cost pair (e.g., the minimum cost pair identifies the smoothed object most similar to the newly detected object) and the newly identified object may be assigned to a corresponding paired smoothed object to build an updated object or object list. A second minimum cost pair may be determined to generate a second updated object. This process may be repeated until all newly identified objects are assigned to a respective paired smoothed object list. This may be exclusively a one-to-one assignment. The remaining unpaired smoothed objects may be retained as un-updated objects (e.g., as one or more objects currently not detected). The remaining unpaired identified objects may be retained as new objects (e.g., objects not previously detected). Each object is categorized as an assigned object after the merging process.

Figure 5:
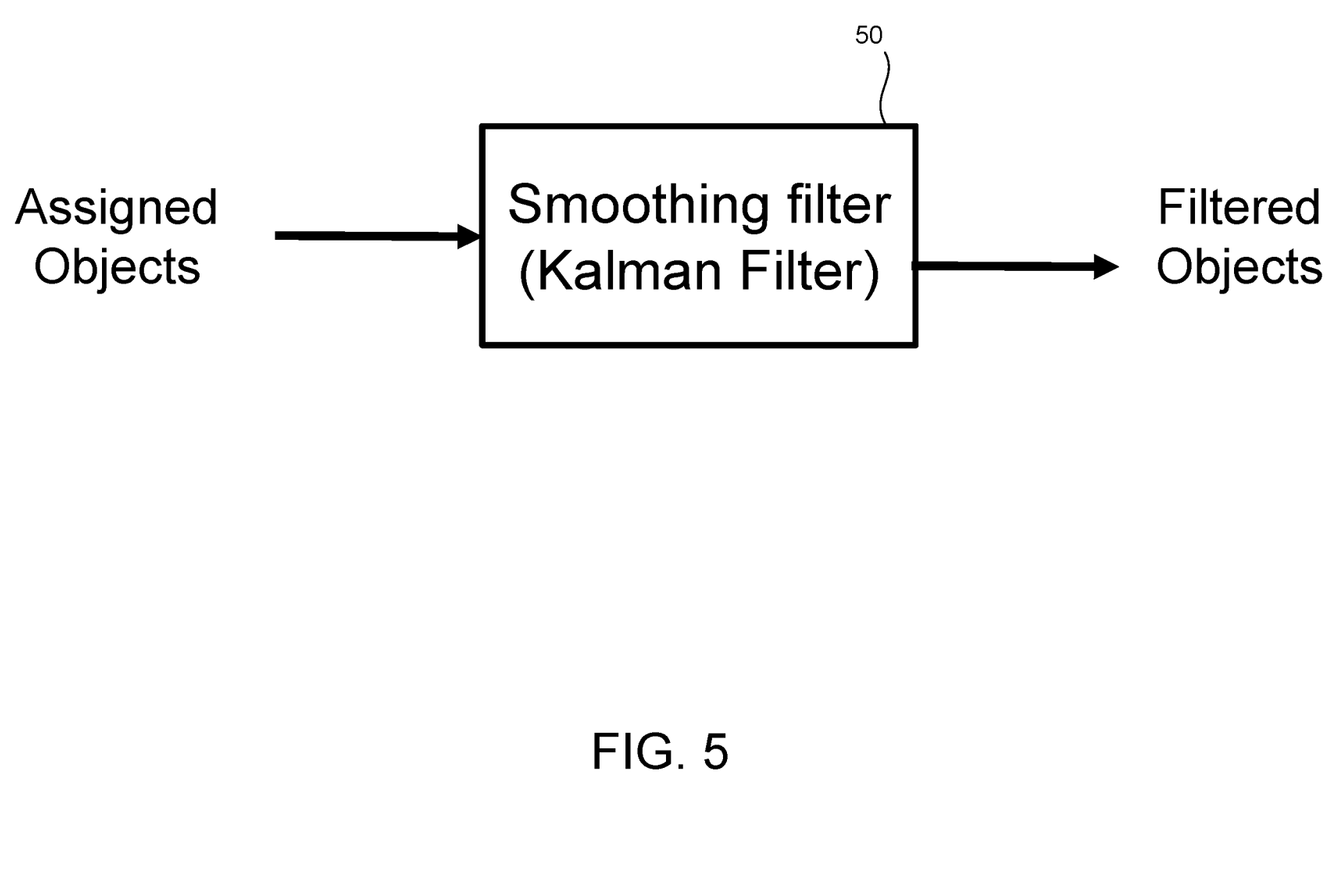
FIG. 5 is a block diagram of an object merging process module of the vehicular vision system of FIG. 3.

Referring now to FIG. 5, the object smoothing filter process module 34 may include one or more smoothing filters 50 such as a Kalman filter to provide smoothed outputs (e.g. Kalman prediction) from previously detected noise inputs. For example, the smoothing filter adjusts or modifies a position of a detected object (e.g., based on a position of a previously detected object). Smoothing filters function best when all inputs are associated with the same features (e.g., each input originates from the feet of the same pedestrian). For example, the smoothing filter modifies a position of a merged object based on a previous position of the merged object (e.g., a position determined from a previous frame of image data). Outliers from inputs due to relatively large thresholds for the object merging process may make the smoothing filter diverge and result in a drift of the smoothed output. Additionally, a thresholding conflict in the merging-smoothing filter loop process tends to have a relatively large threshold to merge multiple detection/features in different locations of one same object together. A smoothing filter process also tends to have a relatively small threshold to minimize the smoothed drift by rejecting outliers and may result in inconsistent object tracking and jumping from frame to frame if a relatively small threshold is applied in the merging process. The smoothing filter process may also result in a drift output if one relatively large threshold is applied in the smoothing filter process.

Figure 6:
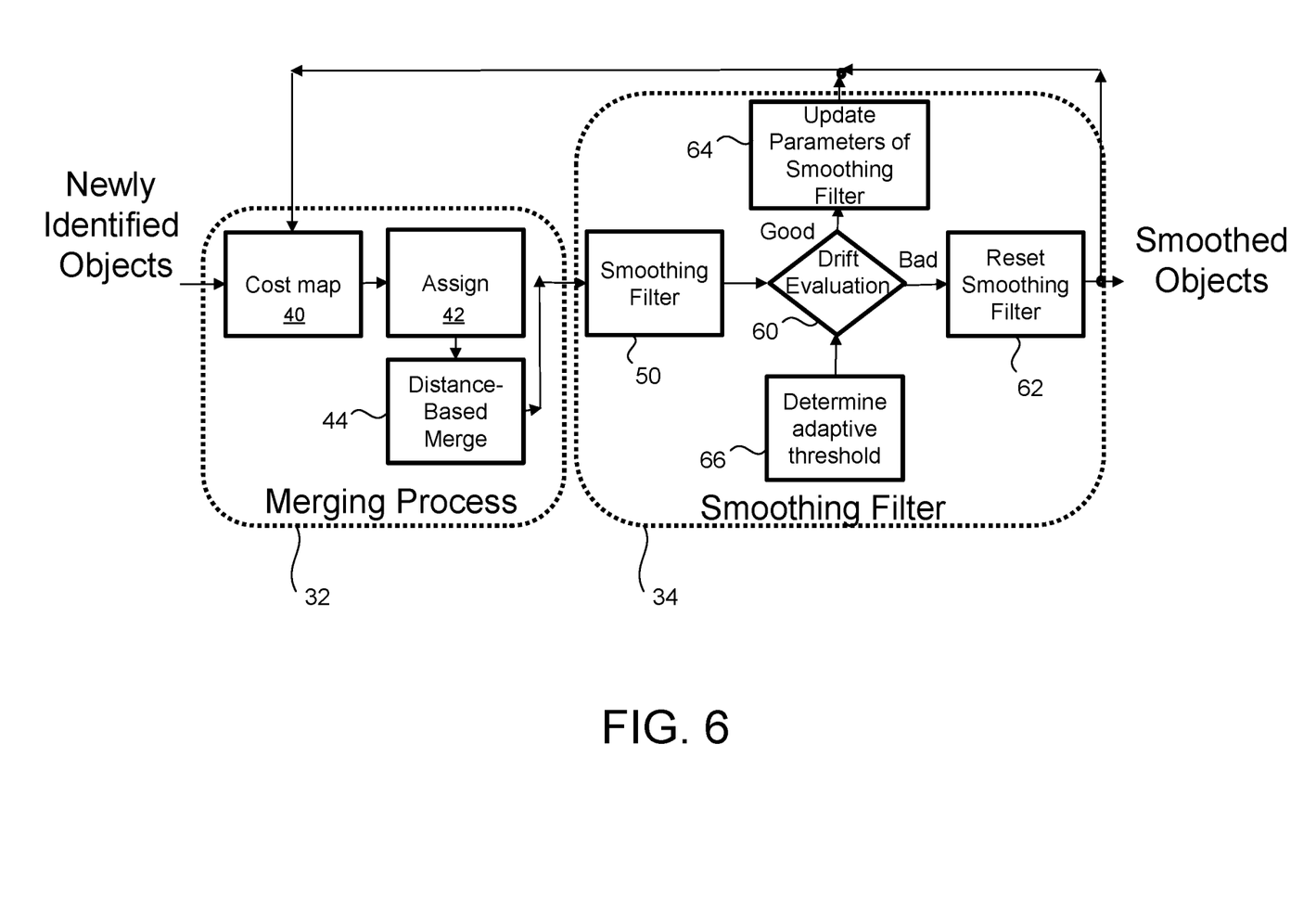
FIG. 6 is a block diagram of the object identification and detection module of FIG. 4 and the object merging process module of FIG. 5.

To address these concerns, outputs of the smoothing filter may be evaluated by a threshold tolerance against the drift. The smoothing filter 50 may be reset when the smoothed drift is above the given threshold. As shown in FIG. 6, a block diagram of the merging-smoothing filter loop includes adaptive thresholding for controlling the smoothing filter parameter update and the reset. For example, after the smoothing filter 50, a drift evaluation 60 determines whether the drift exceeds the current adaptive threshold. When the threshold is exceeded, the smoothing filter 50 is reset at step 62 and when the threshold is not exceeded, the parameters of the smoothing filter 50 are updated at step 64. The adaptive threshold is determined at step 66. The adaptive threshold may be determined based on a number of factors (e.g., the current amount of drift, number of objects, types of objects, position of objects, current conditions, etc.). After the merging process 34, the smoothed object position from previous detections is compared with a current (i.e., new) detected position (i.e., relative to the equipped vehicle) at the i-th frame. This comparison information may be used to determine the thresholds for the smoothing filter.

Figure 7:
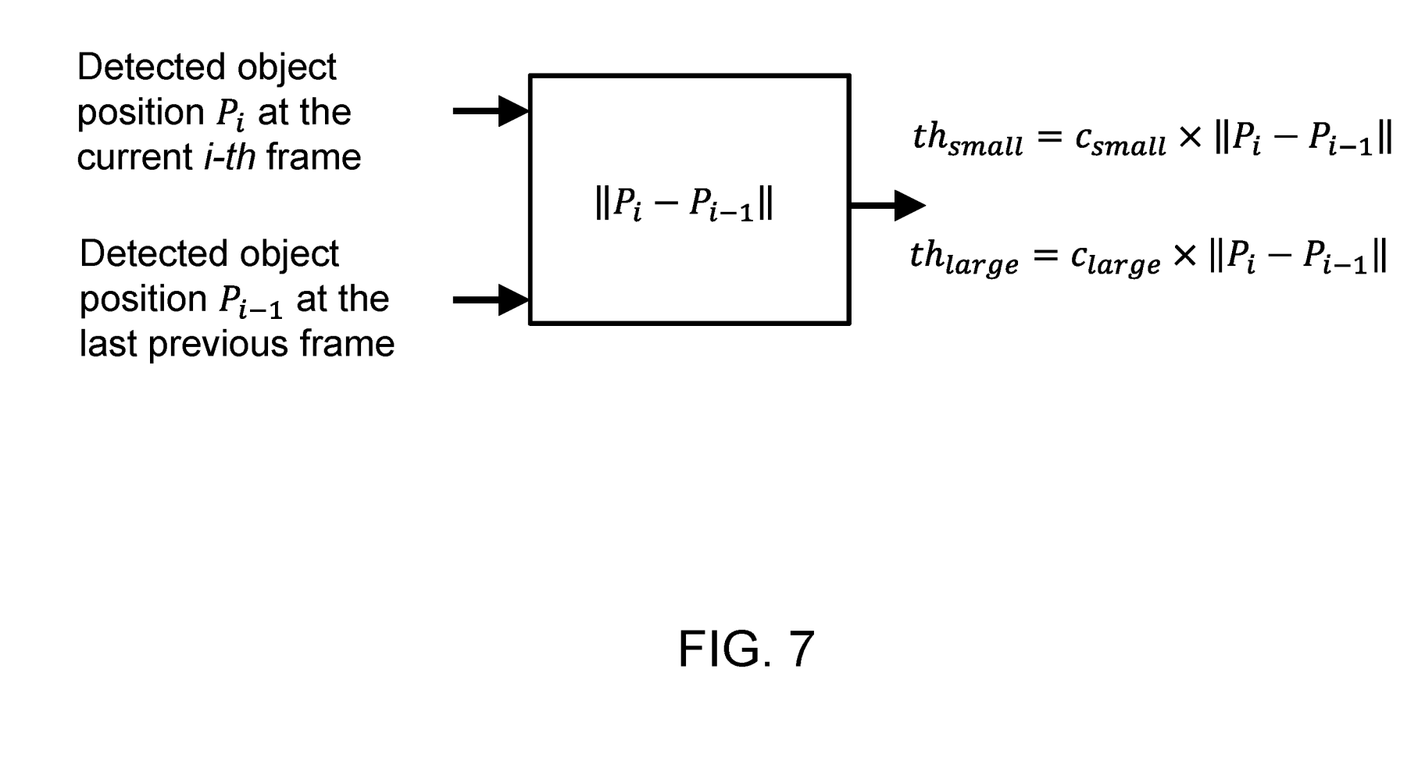
FIG. 7 is a block diagram for determining adaptive thresholds for object smoothing of the vehicular vision system of FIG. 3.

Referring now to FIG. 7, to determine the thresholds, the system may use two predetermined thresholds $th_{small}$ and $th_{large}$ in which $th_{small} < th_{large}$. Alternatively, these two thresholds $th_{small}$ and $th_{large}$ are related to the variation of the last two detected object positions (e.g., when $c_{small}$ and $c_{large}$ are predetermined constant weighting factors). The smoothing filter 50 (such as a Kalman filter) may update the smoothing filter parameters when $\|P_i - \hat{P}_i\| < th_{small}$. The smoothing filter 50 may not update smoothing filter parameters when $th_{small} \leq \|P_i - \hat{P}_i\| < th_{large}$. The smoothing filter 50 may reset when $\|P_i - \hat{P}_i\| \geq th_{large}$.

Thus, the vehicular vision system may detect an object via processing a frame of image data captured by a camera disposed at a vehicle. The system, in a subsequent frame of image data, detects a second object. The system may determine the first object and the second object are the same object based on a similarity measure (e.g., determined using a cost map and/or distance-based merging). The system may generate a merged object from the first object and the second object. Using a smoothing filter (e.g., a Kalman filter), the system smooths the merged object. The system, using the smoothed merged object (e.g., via determining a drift of the smoothed merged object), updates parameters of the smoothing filter, maintains the same parameters of the smoothing filter, or resets the smoothing filter. The system may include object detection techniques such as the types described in U.S. Pat. Nos. 10,452,931, 10,204,279; and/or 10,423,842, and/or U.S. Publication Nos. US 2023-0106188 and/or US-2023-0085024, which are hereby incorporated herein by reference in their entireties.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular vision system, the vehicular vision system comprising:

a camera disposed at a vehicle equipped with the vehicular vision system and viewing exterior of the equipped vehicle, the camera capturing image data;

wherein the camera comprises a CMOS imaging array, and wherein the CMOS imaging array comprises at least one million photosensors arranged in rows and columns;

an electronic control unit (ECU) comprising electronic circuitry and associated software;

wherein the electronic circuitry of the ECU comprises an image processor for processing image data captured by the camera to detect presence of objects in the field of view of the camera;

wherein the vehicular vision system, via processing at the image processor of a first frame of image data captured by the camera, detects a first object exterior of the equipped vehicle and determines a first position of the first detected object relative to the equipped vehicle;

wherein the vehicular vision system, via processing at the image processor of a second frame of image data captured by the camera subsequent to the first frame of image data captured by the camera, detects a second object exterior of the equipped vehicle and determines a second position of the second detected object relative to the equipped vehicle;

wherein the vehicular vision system determines, based on a similarity measure between the first detected object and the second detected object, that the second detected object is the same object as the first detected object;

wherein, responsive to determining that the second detected object is the same object as the first detected object, the vehicular vision system, using a smoothing filter, modifies the determined second position of the second detected object based in part on the determined first position of the first detected object;

wherein the vehicular vision system, based on the modified determined second position of the second detected object relative to the equipped vehicle, updates parameters of the smoothing filter;

wherein the vehicular vision system tracks the second detected object in subsequent frames of image data captured by the camera subsequent to the second frame of image data captured by the camera based at least in part on the modified determined second position of the second detected object; and wherein the vehicular vision system, responsive to tracking of the second detected object, controls a function of the equipped vehicle.

2. The vehicular vision system of claim 1, wherein the vehicular vision system determines if a third object detected via processing at the image processor of a third frame of image data captured by the camera is the same object as the second detected object, and wherein the vehicular vision system, using the smoothing filter with the updated parameters, modifies a determined third position of the third detected object, and wherein the vehicular vision system, based on the modified determined third position of the third detected object, further updates the parameters of the smoothing filter.

3. The vehicular vision system of claim 1, wherein the smoothing filter comprises a Kalman filter.

4. The vehicular vision system of claim 1, wherein the vehicular vision system modifies the determined second position of the second detected object based on a cost map, and wherein the cost map is based on geometric attributes of both the first detected object and the second detected object.

5. The vehicular vision system of claim 1, wherein the vehicular vision system updates the parameters of the smoothing filter by determining an adaptive threshold for drift of the modified determined second position of the second detected object.

6. The vehicular vision system of claim 5, wherein the vehicular vision system updates the parameters of the smoothing filter responsive to determining that the drift of the modified determined second position of the second detected object is less than the adaptive threshold.

7. The vehicular vision system of claim 5, wherein the adaptive threshold is based on (i) the determined first position of the first detected object and (ii) the determined second position of the second detected object.

8. The vehicular vision system of claim 1, wherein the vehicular vision system, using the updated parameters of the smoothing filter, modifies a determined third position of a third detected object, and wherein the vehicular vision system, based on the modified determined third position of the third detected object, resets the parameters of the smoothing filter.

9. The vehicular vision system of claim 8, wherein the vehicular vision system resets the parameters of the smoothing filter responsive to determining that drift of the modified determined third position of the third detected object is greater than a threshold.

10. The vehicular vision system of claim 1, wherein the vehicular vision system, using the updated parameters of the smoothing filter, modifies a determined third position of a third detected object, and wherein the vehicular vision system, based on the modified determined third position of the third detected object, maintains the same parameters of the smoothing filter.

11. The vehicular vision system of claim 10, wherein the vehicular vision system maintains the same parameters of the smoothing filter responsive to determining that drift of the modified determined third position of the third detected object is (i) greater than a first threshold and (ii) less than a second threshold, and wherein the first threshold and the second threshold are each based on (a) the modified determined second position of the second detected object and (b) the modified determined third position of the third detected object.

12. The vehicular vision system of claim 1, wherein the vehicular vision system, responsive to determining that the second detected object is the same object as the first detected object, merges the first detected object with the second detected object to generate a merged object, and wherein the vehicular vision system tracks the merged object.

13. A vehicular vision system, the vehicular vision system comprising:
a camera disposed at a vehicle equipped with the vehicular vision system and viewing exterior of the equipped vehicle, the camera capturing image data;
wherein the camera comprises a CMOS imaging array, and wherein the CMOS imaging array comprises at least one million photosensors arranged in rows and columns;
an electronic control unit (ECU) comprising electronic circuitry and associated software;
wherein the electronic circuitry of the ECU comprises an image processor for processing image data captured by the camera to detect presence of objects in the field of view of the camera;
wherein the vehicular vision system, via processing at the image processor of a first frame of image data captured by the camera, detects a first object exterior of the equipped vehicle and determines a first position of the first detected object relative to the equipped vehicle;
wherein the vehicular vision system, via processing at the image processor of a second frame of image data captured by the camera subsequent to the first frame of image data captured by the camera, detects a second object exterior of the equipped vehicle and determines a second position of the second detected object relative to the equipped vehicle;
wherein the vehicular vision system generates a cost map using (i) one or more attributes of the first detected object and (ii) one or more attributes of the second detected object;
wherein the vehicular vision system, using the cost map, determines a similarity measure between the first detected object and the second detected object;
wherein the vehicular vision system determines, based on the similarity measure between the first detected object and the second detected object, that the second detected object is the same object as the first detected object;
wherein, responsive to determining that the second detected object is the same object as the first detected object, the vehicular vision system, using a smoothing filter, modifies the determined second position of the second detected object based in part on the determined first position of the first detected object;
wherein the vehicular vision system, based on a difference between the determined first position of the first detected object and the determined second position of the second detected object, updates parameters of the smoothing filter;
wherein the vehicular vision system tracks the second detected object in subsequent frames of image data captured by the camera subsequent to the second frame of image data captured by the camera based at least in part on the modified determined second position of the second detected object; and
wherein the vehicular vision system, responsive to tracking of the second detected object, controls a function of the equipped vehicle.

14. The vehicular vision system of claim 13, wherein the smoothing filter comprises a Kalman filter.

15. The vehicular vision system of claim 13, wherein the one or more attributes of the first detected object comprise one or more first geometric attributes, and wherein the one or more attributes of the second detected object comprise one or more second geometric attributes.

16. The vehicular vision system of claim 13, wherein the vehicular vision system updates the parameters of the smoothing filter by determining an adaptive threshold for drift of the modified determined second position of the second detected object.

17. The vehicular vision system of claim 6, wherein the vehicular vision system updates the parameters of the smoothing filter responsive to determining that the drift of the modified determined second position of the second detected object is less than the adaptive threshold.

18. A vehicular vision system, the vehicular vision system comprising:
a camera disposed at a vehicle equipped with the vehicular vision system and viewing exterior of the equipped vehicle, the camera capturing image data;
wherein the camera comprises a CMOS imaging array, and wherein the CMOS imaging array comprises at least one million photosensors arranged in rows and columns;

an electronic control unit (ECU) comprising electronic circuitry and associated software;

wherein the electronic circuitry of the ECU comprises an image processor for processing image data captured by the camera to detect presence of objects in the field of view of the camera;

wherein the vehicular vision system, via processing at the image processor of a first frame of image data captured by the camera, detects a first object exterior of the equipped vehicle and determines a first position of the first detected object relative to the equipped vehicle;

wherein the vehicular vision system, via processing at the image processor of a second frame of image data captured by the camera subsequent to the first frame of image data captured by the camera, detects a second object exterior of the equipped vehicle and determines a second position of the second detected object relative to the equipped vehicle;

wherein the vehicular vision system determines, based on a similarity measure between the first detected object and the second detected object, that the second detected object is the same object as the first detected object;

wherein, responsive to determining that the second detected object is the same object as the first detected object, the vehicular vision system, using a Kalman filter, modifies the determined second position of the second detected object based in part on the determined first position of the first detected object;

wherein the vehicular vision system determines an adaptive threshold for drift of the modified determined second position of the second detected object based on the determined second position;

wherein the vehicular vision system, based on the adaptive threshold, updates parameters of the Kalman filter;

wherein the vehicular vision system tracks the second detected object in subsequent frames of image data captured by the camera subsequent to the second frame of image data captured by the camera based at least in part on the modified determined second position of the second detected object; and wherein the vehicular vision system, responsive to tracking of the second detected object, controls a function of the equipped vehicle.

19. The vehicular vision system of claim 18, wherein the vehicular vision system updates the parameters of the Kalman filter responsive to determining that the drift of the modified determined second position of the second detected object is less than the adaptive threshold.

20. The vehicular vision system of claim 18, wherein the adaptive threshold is further based on the determined first position of the first detected object.

21. The vehicular vision system of claim 18, wherein the vehicular vision system determines if a third object detected via processing at the image processor of a third frame of image data captured by the camera is the same object as the second detected object, and wherein the vehicular vision system, using the Kalman filter with the updated parameters, modifies a determined third position of the third detected object, and wherein the vehicular vision system, based on the modified determined third position of the third detected object, further updates the parameters of the Kalman filter.

* * * * *